United States Patent [19]
Sunagawa et al.

[11] Patent Number: 5,748,283
[45] Date of Patent: May 5, 1998

[54] LIGHT-SOURCE DEVICE FOR EXPOSURE AND LIGHT-SOURCE DEVICE FOR IMAGE READING

[75] Inventors: Hiroshi Sunagawa; Atsushi Uejima; Osamu Iwasaki; Takaaki Aihara, all of Kanagawa, Japan

[73] Assignee: Fuji Photo Film Co., Ltd., Kanagawa, Japan

[21] Appl. No.: 719,981

[22] Filed: Sep. 24, 1996

[30]  Foreign Application Priority Data

Sep. 26, 1995 [JP] Japan .................... 7-247558

[51] Int. Cl.$^6$ .................... G03B 27/72; G03B 27/32; G03B 27/52; G03B 27/54
[52] U.S. Cl. .................... 355/35; 355/32; 355/37; 355/67; 355/70
[58] Field of Search .................... 399/4, 219; 358/484; 355/37, 32, 35, 67, 70

[56]  References Cited

U.S. PATENT DOCUMENTS

| | | | |
|---|---|---|---|
| 5,132,722 | 7/1992 | Fujii | 355/37 |
| 5,262,827 | 11/1993 | Lee | 355/67 |
| 5,339,132 | 8/1994 | Tomita et al. | 355/200 |
| 5,515,136 | 5/1996 | Nishio et al. | 355/37 |
| 5,581,076 | 12/1996 | Tabata | 358/484 |

FOREIGN PATENT DOCUMENTS 8-15788  1/1996  Japan .................... G03B 27/54

*Primary Examiner*—R. L. Moses
*Assistant Examiner*—Shival Virmani
*Attorney, Agent, or Firm*—Sughrue, Mion, Zinn, Macpeak & Seas, PLLC

[57]  ABSTRACT

Respective light-emitting elements are caused to emit light at the maximum rated outputs and densities of three colors developed by a photosensitive material are made substantially uniform. The maximum rated outputs at light-emitting central wavelengths, of the three-color light-emitting elements are respectively 2.4 mW, 0.04 mW and 1.2 mW. The ratio between the outputs is represented as R:G:B=60:1:30. On the other hand, the ratio between spectral sensitivities of the most-frequently used photosensitive material is represented as R:G:B=1:30:2. An exposure-value ratio on the photosensitive material, which is synthetically obtained from these, reaches R:G:B=2:1:2. Thus, the numerical ratio among the light-emitting elements, for making exposure values uniform becomes R:G:B=1:2:1. The numbers of the respective light-emitting elements are defined so as to reach the least numbers from the numerical ratio (i.e., one R-light-emitting element, two G-light-emitting elements and one B-light-emitting element). Further, a repetition of R-G-B-G, R-G-G-B or the like is most suitable as the sequence of arrangement of the light-emitting elements.

20 Claims, 4 Drawing Sheets o: TURN ON
x: TURN OFF

LIGHT-SOURCE DEVICE FOR EXPOSURE AND LIGHT-SOURCE DEVICE FOR IMAGE READING

BACKGROUND OF THE INVENTION

1. Field of the Invention

The present invention relates to a light-source device for exposure used for irradiating the surface of an original with light while being moved relative to the original, and focusing light reflected from or transmitted through the surface thereof onto a photosensitive material so as to subject the photosensitive material to slit exposure, and to a light-source device for image reading used for irradiating the surface of an original with light while being moved relative to the original and focusing light reflected from or transmitted through the surface thereof onto an image reading means to thereby read an image.

2. Description of the Related Art

In general, an image recording apparatus for irradiating an image recorded on an original with light and focusing transmitted or reflected light onto a photosensitive material using a lens system so as to form an image corresponding to the original image on the photosensitive material makes use of a white light source such as a halogen lamp or the like. In the image recording apparatus, so-called slit exposure using an elongated light source has been performed which allows the original image and the light source to move relative to each other to change irradiation positions of light emitted from the light source and successively focuses light reflected from or transmitted through the irradiation positions onto the photosensitive material.

When a white light source such as a halogen lamp or the like is used as a light source for exposure of color images, filters had to be used to perform color correction. On the other hand, an exposure device in which LEDs (Light Emitting Diodes) for emitting light of Red (R), Green (G) and Blue (B) colors, for example, are used as light sources, has been proposed for the purpose of reducing the size of a light-source device (see Japanese Patent Application Laid-Open No. 8-15788, for example). The LED produces light having a wavelength according to a crystal material in each light-emitting element therefrom in response to a predetermined bias voltage applied to the crystal material. The LED enables less power consumption and a reduction in the quantity of generated heat and provides a satisfactory blinking response.

In the exposure device using the LEDs as the light sources, three LED arrays are often used in which a number of light-emitting elements are provided to emit different light for Red, Green and Blue. Alternatively, a plurality of LEDs for respective colors are arranged on a single array in a predetermined sequence.

The LEDs for the respective colors normally differ in rated output from each other and serve as light sources which are uneven in color balance if the same current is supplied thereto under the same number. In the existing circumstances, the G LED provides an output (light output) lower than outputs of B and R LEDs. Therefore, an image to turn gray as a reference color produces a color of M (magenta), for example.

In order to solve this, the currents for driving the respective LEDs may be controlled so as to correct variations in light outputs of the respective colors. This, however, leads to the focusing of a large light output (i.e., reduces the currents) as a matter of course, thus resulting in an increase in exposure time correspondingly.

When the three-color LEDs are arranged to perform exposure, partial uneven color might occur according to the sequence of arrangement of the LEDs even if they are kept in color balance as a whole.

Exposure values of respective colors on a photosensitive material are affected even by a characteristic (spectral sensitivity characteristic of photosensitive material) of the photosensitive material.

When the original image is read by an image reading means such as a CCD color image sensor or the like using the aforementioned light source, the exposure values are also affected even by light-receiving sensitivity of the image reading means.

SUMMARY OF THE INVENTION

With the foregoing in view, it is therefore an object of the present invention to provide a light-source device for exposure, which is capable of causing light-emitting elements to emit light at the maximum outputs and making densities of three colors produced by a photosensitive material substantially uniform, and to a light-source device for image reading capable of making densities of three colors read by an image reading means substantially identical to each other.

According to a first aspect of the present invention, there is provided a light-source device for irradiating the surface of an original with light while being moved relative to the original and focusing light reflected from or transmitted through the surface of the original onto a photosensitive material so as to subject the photosensitive material to slit exposure, comprising:

light-emitting elements for emitting three colors having different light-emitting wavelengths, each element of the three-color light-emitting elements being linearly arranged at predetermined intervals and disposed so as to meet at right angles to the direction in which the original is conveyed, the element numbers of each color of the three-color light-emitting elements being set based on a ratio between outputs of the three-color light-emitting elements at their light-emitting wavelengths when the three-color light-emitting elements are caused to emit light at the maximum rated outputs and a ratio between sensitivities of the photosensitive material at the light-emitting wavelengths in such a manner that when at least the two-color light-emitting elements of the three-color light-emitting elements are caused to emit light at the maximum rated outputs, densities of colors on the photosensitive material, which are exposed by the light-emitting elements and developed, are substantially identical to each other.

According to the first aspect of the present invention, the color light-emitting elements are respectively set in number based on the ratio between the outputs of the three-color light-emitting elements at their light-emitting wavelengths when the three-color light-emitting elements are caused to emit the light at the maximum rated outputs and the ratio between the sensitivities of the photosensitive material at the light-emitting wavelengths. When at least the two-color light-emitting elements of the three-color light-emitting elements are caused to emit the light at the maximum rated outputs in this case, the numbers of the respective three-color light-emitting elements are respectively set such that the densities of the colors on the photosensitive material, which are produced by the three-color light-emitting elements, are substantially identical to each other.

Thus, no color variations occur on the photosensitive material and an exposure time can be shortened.

In a second aspect of the present invention, the sequence of arrangement of each element of the three-color light-emitting elements is set so that the respective colors are substantially uniform in irradiation within a predetermined unit irradiation region on the photosensitive material.

According to the second aspect of the present invention, the sequence of arrangement of the light-emitting elements is set in such a manner that the respective colors are made substantially uniform in irradiation within the predetermined unit irradiation region on the photosensitive material. If done in this way, then the necessary quantity of light is determined from the exposure time and a plurality of sets of light sources in which the light source in a unit irradiation region is defined as a set, may be disposed.

In a third aspect of the present invention, a region to be illuminated by a group of the least number of light-emitting elements necessary to make the respective colors produced by the light-emitting elements substantially uniform in irradiation is defined as the unit irradiation region.

According to the third aspect of the present invention, the more the unit irradiation region is reduced in size, the more color variations can be made nonprominent. Therefore, the numbers of the respective light-emitting elements at which the respective colors are kept substantially uniform in irradiation, are respectively set to the least numbers corresponding to an integral multiple of the number of the light-emitting elements and the light-emitting element group is defined as a unit irradiation region. When the numerical ratio of R:G:B is represented as 1:2:1, for example and the colors are made substantially uniform in irradiation, four light-emitting elements may be set as a light-emitting element group (unit irradiation region).

In a fourth aspect of the present invention, the numbers of the respective light-emitting elements for the colors and the sequence of arrangement thereof are respectively set according to a spectral sensitivity characteristic of the most-frequently used photosensitive material of a plurality of types of photosensitive materials to be used and preliminary or reserve light-emitting elements are respectively disposed according to spectral sensitivity characteristics of the photosensitive materials in order in which the frequency of use of the photosensitive materials is high, in the first through third aspects of the present invention.

According to the fourth aspect of the present invention, the numbers of the respective light-emitting elements and the sequence of arrangement thereof are respectively set according to the color sensitivity characteristic of the most-frequently used photosensitive material in the principal light-source device for exposure. Thus, the colors can be normally kept in balance and processed in the shortest exposure time. When the photosensitive material is now changed to another one, the photosensitive material varies in color sensitivity characteristic and is hard to keep colors in balance. Therefore, reserve light sources are disposed according to color sensitivity characteristics of photosensitive materials used in order in which the frequency of use thereof is high and the relationship between the type of photosensitive material and necessary reserve light-emitting elements is set as a database. Thus, a light source most suitable for the simply changed photosensitive material can be obtained.

According to a fifth aspect of the present invention, there is provided a light-source device for irradiating the surface of an original with light while being moved relative to the original and focusing light reflected from or transmitted through the surface of the original onto an image reading means so as to read an image of said original, comprising:

light-emitting elements for producing three colors having light-emitting wavelengths different from each other, the three-color light-emitting elements being linearly arranged at predetermined intervals and disposed so as to meet at right angles to the direction in which the original is conveyed, the three-color light-emitting elements being respectively set in number based on a ratio between outputs of the three-color light-emitting elements at their light-emitting wavelengths when the three-color light-emitting elements are caused to emit light at the maximum rated outputs and a ratio between sensitivities of the image reading means at the light-emitting wavelengths in such a manner that when at least the two-color light-emitting elements of the three-color light-emitting elements are caused to emit light at the maximum rated outputs, densities of colors produced by the three-color light-emitting elements, which have been read by the image reading means, are substantially identical to each other.

According to the fifth aspect of the present invention, the image reading light-source device can bring about an advantageous effect similar to that obtained by the light-source device according to the first aspect of the present invention.

In a sixth aspect of the present invention, the sequence of arrangement of the three-color light-emitting elements is set so that the respective colors are substantially uniform in irradiation within a predetermined unit irradiation region on the image reading means.

According to the sixth aspect of the present invention, the image reading light-source device can bring about an advantageous effect similar to that obtained by the light-source device according to the second aspect of the present invention.

In a seventh aspect of the present invention, a region to be illuminated by a group of the least number of light-emitting elements necessary to make the respective colors produced by the light-emitting elements substantially uniform in irradiation is defined as the unit irradiation region.

According to the seventh aspect of the present invention, the image reading light-source device can bring about an advantageous effect similar to that obtained by the light-source device according to the third aspect of the present invention.

Incidentally, the term "arrangement of three-color light-emitting elements at predetermined intervals in linear form" in the first through fifth aspects of the present invention includes arrangements of three-color light-emitting elements at regular and irregular intervals.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DETAILED DESCRIPTION OF THE
PREFERRED EMBODIMENTS (First embodiment)

Figure 1:
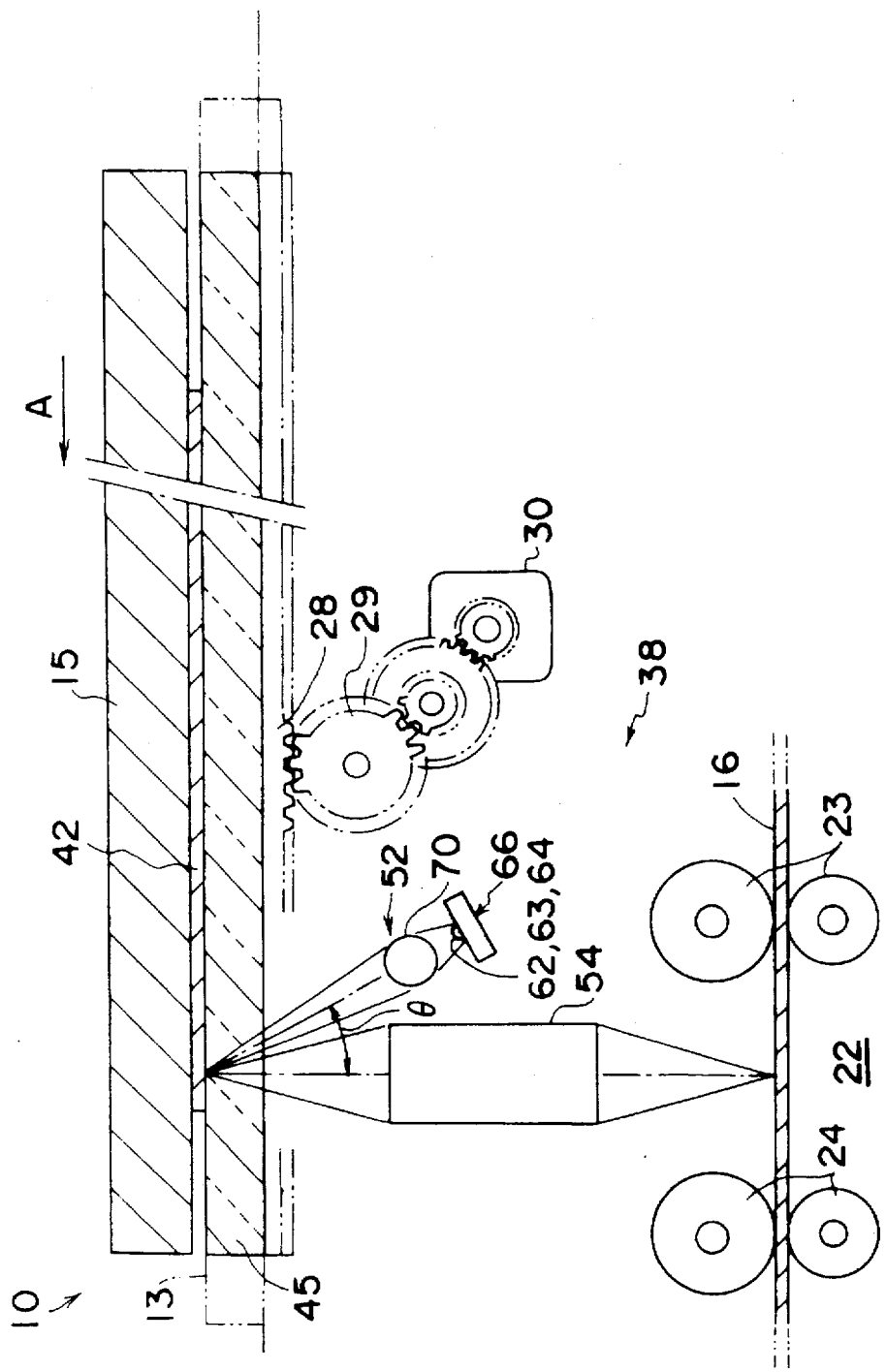
FIG. 1 is a view schematically showing the structure of an exposure device to which a light-source device according to an embodiment of the present invention is applied.

FIG. 1 schematically shows the structure of an image recording apparatus 10 using a light-source device of the present invention. The image recording apparatus 10 subjects a thermally-developed photosensitive material to exposure according to an image recorded on an original and thereafter superimposes an image receiving material on the thermally-developed photosensitive material so as to form the image onto the image receiving material by thermal development.

The image recording apparatus 10 is shaped in the form of a case as a whole. In the image recording apparatus 10, unillustrated doors provided at the front and side portions of an apparatus base 12 for forming the case can be opened so as to expose the inside thereof. Further, a placement table 13 for placing an original 42 with an image recorded thereon is provided on the upper surface of the apparatus base 12 of the image recording apparatus 10. The placement table 13 is supported by unillustrated rails so as to be movable along the upper surface of the apparatus base 12 in the left and right directions as seen on the sheet of FIG. 2.

A rectangular hole is defined in the placement table 13 of the image recording apparatus 10 and a transparent glass plate 45 is attached to the placement table 13. Further, a pressing or pressure cover 15 which is rotated with the side thereof in the innermost of the sheet of FIG. 2 as the axis so as to open and close the image recording apparatus 10, is provided on the transparent glass plate 45.

As shown in FIG. 1, a rack 28, which is maintained in meshing engagement with a gear 29, is provided below the placement table 13. The gear 29 is coupled to a motor 30 through a plurality of gears. The gear 29 is rotated under the action of the motor 30 so that the placement table 13 is displaced in the direction indicated by arrow A and in the direction opposed to the arrow A direction along the unillustrated rails together with the pressure cover 15.

On the other hand, a magazine 14 having a photosensitive material 16, which has been wound in a roll form and accommodated therein, is loaded in the apparatus base 12 of the image recording apparatus 10. The photosensitive material 16 is held within the magazine 14 so that a photosensitive surface (exposure surface) is pointed in the direction below the image recording apparatus 10.

A pair of nip rollers 18 and a cutter 20 are provided in the vicinity of a photosensitive-material withdrawal aperture of the magazine 14. The pair of nip rollers 18 nips a leading end portion of the photosensitive material 16 delivered from the magazine 14 therebetween to pull out the photosensitive material 16 from the magazine 14. Thereafter, the cutter 20 cuts the pulled-out photosensitive material 16 to a predetermined length.

Pairs of conveying rollers 19, 21, 23, 24, 26 and a guide plate 27 are disposed at a side portion of the cutter 20. They serve so as to convey the photosensitive material 16 cut to the predetermined length by the cutter 20 to an upper exposure portion 22. In the course of its conveying, the photosensitive material 16 is turned upside down or reversed so that the exposure surface is pointed upward.

The pairs of conveying rollers 23 and 24 constitute a part of the exposure portion 22. An exposure point is provided between the pairs of rollers 23 and 24. When the photosensitive material 16 passes through the exposure point, an image is exposed. Incidentally, the motor 30 is activated in synchronism with the passage of the photosensitive material 16 through the exposure point so that the placement table 13 is shifted in the same direction as the photosensitive material 16 (i.e., in the direction indicated by arrow A in FIGS. 1 and 2). The placement table 13 is temporarily displaced in the direction opposed to the arrow A direction from a position indicated by an imaginary line in FIG. 2 until the photosensitive material 16 reaches the exposure portion 22.

An exposure device 38 is provided above the exposure portion 22 and within a space below the transparent glass plate 45.

Figure 2:
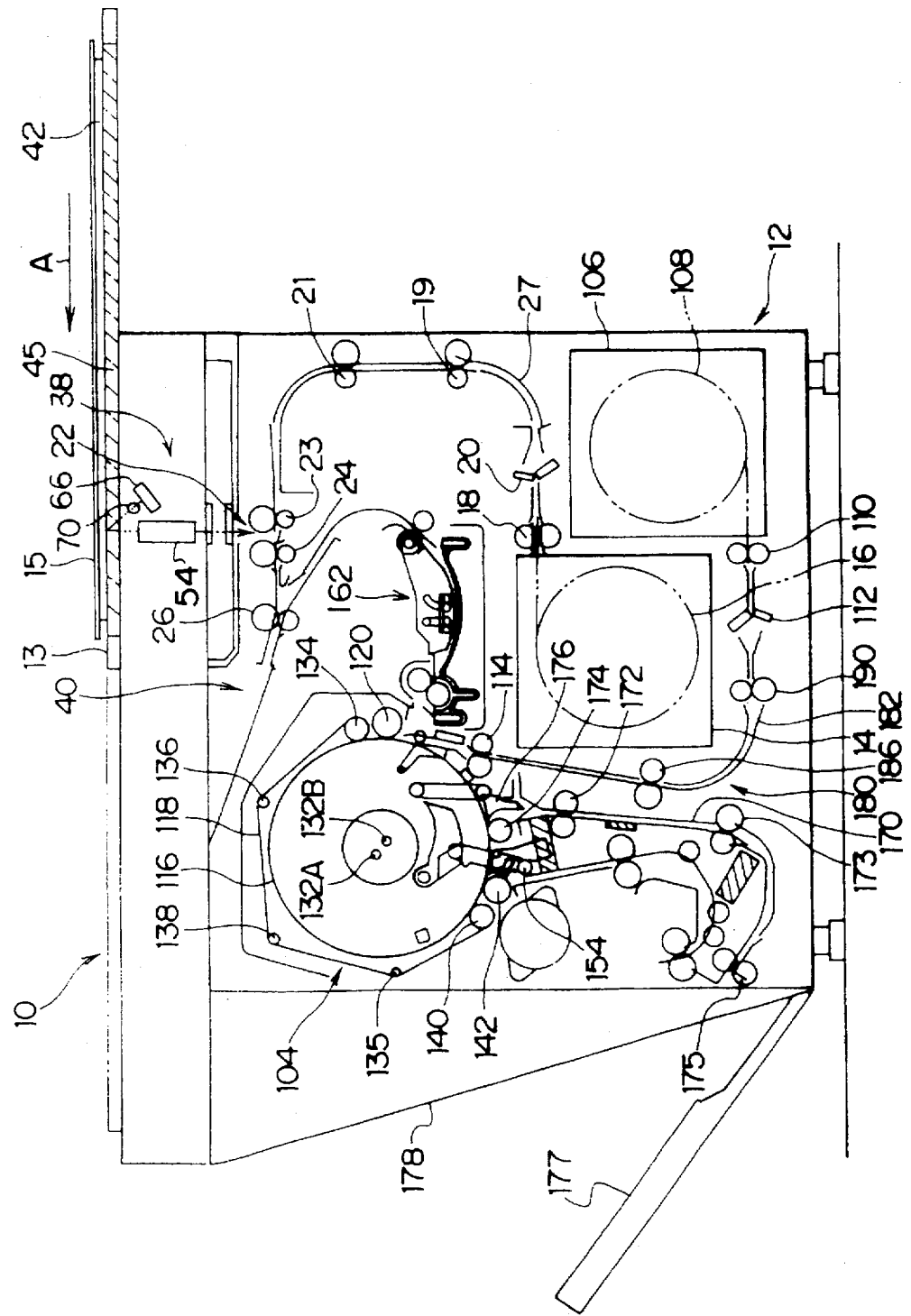
FIG. 2 is a view schematically illustrating an image forming apparatus applied to the light-source device shown in FIG. 1.

As shown in FIG. 2, the exposure device 38 comprises an LED array 66 (light-source device for exposure), a rod lens 70 and a rod lens array 54.

As also shown in FIG. 1, the exposure device 38 performs slit exposure. Namely, the exposure device 38 serves so as to focus light reflected in the direction of the normal to the original 42 according to the image from the original 42 subjected to light in slit form by the LED array 66 and the rod lens 70, onto the photosensitive material 16 at the exposure point by means of the rod lens array 54. At this time, the photosensitive materials 16 are successively exposed according to the images recorded on the originals 42 by moving the originals 42 and the photosensitive materials 16 in the direction indicated by arrow A at a predetermined speed.

Figure 3A:
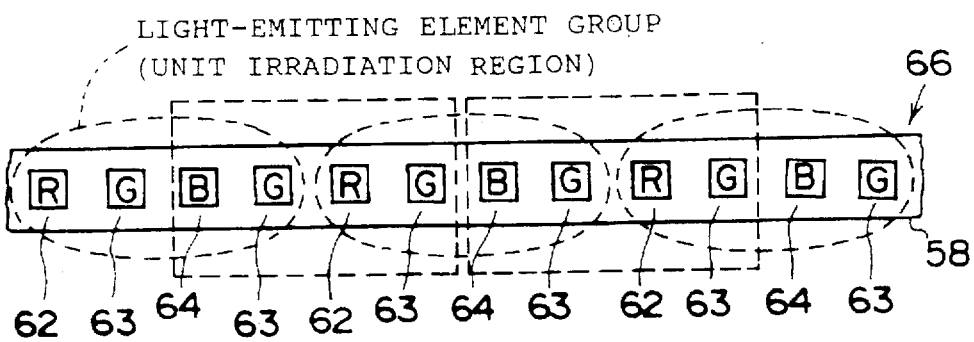
FIGS. 3A and 3B are respectively plan views showing LED arrays in which the number of light-emitting elements in a unit light-emitting element group and the sequence of arrangement thereof are both suitably set.
Figure 3B:
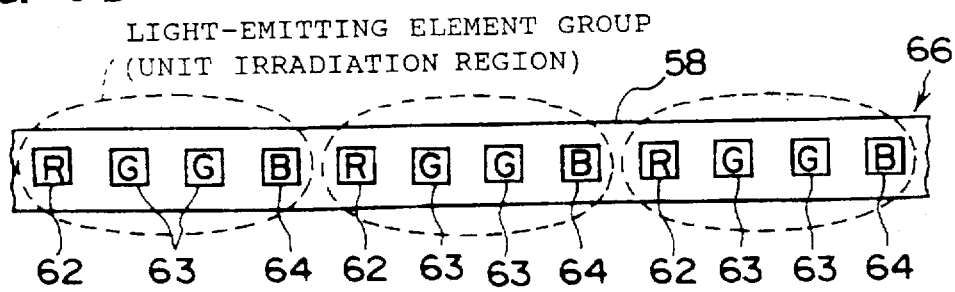
Figure 3C:
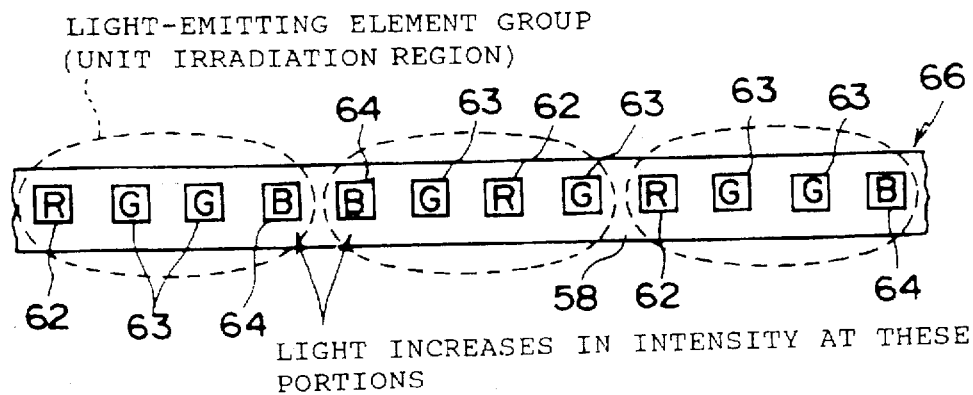
FIG. 3C is a plan view illustrating an LED array in which the number of light-emitting elements in a unit light-emitting element group is suitably set but the sequence of arrangement thereof is unsuitably set.

As shown in FIGS. 3A, 3B and 3C, the LED array 66 is provided in which 0.3 mm-square type light-emitting elements 62, 63 and 64 of three colors of R (Red), G (Green) and B (Blue) for example are linearly disposed in the center of a substrate 58. In the LED array 66, the light-emitting elements 62, 63 and 64 are respectively alternately disposed at predetermined intervals and electrodes (not shown) are provided on both sides of the substrate 58 with the light-emitting elements 62, 63 and 64 interposed therebetween. Since the light-emitting elements 62, 63 and 64 are linearly disposed in the LED array 66, the electrodes can be provided on both sides of the substrate 58 and a number of light-emitting elements 62, 63 and 64 can be disposed at narrow pitch intervals.

In the present embodiment, the numbers of the respective light-emitting elements 62, 63 and 64 and the sequence of arrangement thereof are respectively set based on a ratio between outputs at light-emitting wavelengths at the time that the respective light-emitting elements 62, 63 and 64 produce light at the maximum rated outputs and a ratio between color sensitivities on the most-frequently used photosensitive material 16.

Namely, the maximum rated output of the R-light-emitting element 62 whose light-emitting central wavelength is 660 nm, is 2.4 mW, the maximum rated output of the G-light-emitting element 63 whose light-emitting central wavelength is 555 nm, is 0.04 mW and the maximum rated output of the B-light-emitting element 64 whose light-emitting central wavelength is 450 nm, is 1.2 mW. If the ratio is taken among these, then an output ratio reaches R:G:B=60:1:30.

On the other hand, the color-sensitivity ratio of the frequently-used photosensitive material 16 reaches R:G:B= 1:30:2.

An exposure-value ratio on the photosensitive material 16, which is synthetically obtained from these, reaches R:G:B=2:1:2. Thus, in order to make exposure values uniform, the numerical ratio among the light-emitting elements may be determined from the exposure-value ratio. As a result, the numerical ratio among the light-emitting elements becomes R:G:B=1:2:1.

In the present embodiment, the numbers of the respective light-emitting elements are respectively defined from the numerical ratio so as to reach the least numbers. Namely, one R-light-emitting element 62, two G-light-emitting elements 63 and one B-light-emitting element 64 are defined as a light-emitting element group (i.e., a unit irradiation region).

Further, the sequence of arrangement of the R-, G- and B-light-emitting elements may preferably be set at random in the light-emitting element group. Furthermore, the light-emitting elements of the same colors may preferably be set so as not to be continuous between the adjacent light-emitting element groups. Namely, the light-emitting element groups may be more preferably arranged in the form of (R-G-B-G), (R-G-B-G), . . . , as shown in FIG. 3A because the irradiation of light from the individual light-emitting elements in a predetermined unit irradiation region is made uniform. Alternatively, (R-G-G-B) may be repeated so as to appear contiguously to (R-G-G-B) as shown in FIG. 3B. If the same colors are made continuous between the adjacent light-emitting element groups, then non-uniformity in irradiation occurs as shown in FIG. 3C. It is therefore not preferable to continuously provide the same colors.

As mentioned above, the rod lens 70 is provided in front of the LED array 66 and collects or gathers light emitted from the individual light-producing elements 62, 63 and 64 of the LED array 66 so as to apply the light to the same position of the original 42 on the transparent glass plate 45 in slit form along the transverse direction (i.e., the direction of the front and back of the sheet). Incidentally, the rod lens 70 has the function of suppressing nonuniformity in irradiation on the surface of the original 42, which occurs among the light-emitting elements 62, 63 and 64 which produce the same color, according to the pitch intervals between the adjacent light-emitting points.

As shown in FIG. 2, the LED array 66 is disposed close to the rod lens array 54. Further, an angle θ formed between the optical axis of the light applied to the original 42 from each individual light-emitting element of the LED array 66 and the optical axis of the light transmitted through the rod lens array 54 for focusing the image of the original 42 onto the corresponding photosensitive material 16, is set as about 45°.

On the other hand, as shown in FIG. 2, a switchback portion 40 is provided at a side portion of the exposure portion 22 and a water applicator 162 is provided below the exposure portion 22. The photosensitive material 16, which moves upward along a side portion of the magazine 14 and is subjected to image exposure by the exposure portion 22, is temporarily conveyed to the switchback portion 40 and thereafter delivered to the water applicator 162 under the reverse rotation of the pair of conveying rollers 26 through a conveying path defined below the exposure portion 22.

A plurality of pipes supplied with water to be applied to the photosensitive material 16 are coupled to the water applicator 162. Further, a thermal development/transfer portion 104 having a heating drum 116 is provided at a side portion of the water applicator 162. The water applicator 162 applies water to the surface of the photosensitive material 16 and removes excess water therefrom, after which the so-processed photosensitive material 16 is conveyed to the thermal development/transfer portion 104.

On the other hand, an image-receiving material accommodating magazine 106 is loaded into the apparatus base 12 at the side portion of the magazine 14. An image receiving material 108 is wound and accommodated in roll form within the magazine 106. A dye fixing material having a mordant is applied onto an image-forming surface of the image receiving material 108. The image-forming surface thereof is accommodated within the magazine 106 so as to be in an upward direction when it is pulled out from the magazine 106.

A pair of nip rollers 110 is disposed in the vicinity of an image-receiving material withdrawal aperture defined in the magazine 106. The nip rollers 110 can nip a leading end portion of the image receiving material 108 fed out from the magazine 106 so as to withdraw the image receiving material 108 and is able to release the image receiving material 108 from being nipped therebetween. A cutter 112 is provided at a side portion of the pair of nip rollers 110. The cutter 112 cuts the image receiving material 108 withdrawn from the magazine 106 to a predetermined length. The remaining image receiving material 108 is pulled back into the magazine 106 again.

An image-receiving material conveying portion 180 is provided at a side portion of the cutter 112 so as to be adjacent to the side portion of the magazine 14. The image-receiving material conveying portion 180 comprises pairs of conveying rollers 186, 190, 114 and a guide plate 182 and conveys the image receiving material 108 which has been cut to a predetermined length to the thermal development/transfer portion 104.

On the other hand, the photosensitive material 16 fed into the thermal development/transfer portion 104 is conveyed between a lamination roller 120 and a heating drum 116. Further, the image receiving material 108 is conveyed between the lamination roller 120 and the heating drum 116 in synchronism with the conveyance of the photosensitive material 16 when the photosensitive material 16 is in advance of the image receiving material 108 by a predetermined length. Thereafter, the photosensitive material 16 and the image receiving material 108 are superimposed on one another.

A pair of halogen lamps 132A and 132B is disposed within the heating drum 116 so as to raise the surface of the heating drum 116 to a predetermined temperature.

Five winding rollers 134, 135, 136, 138 and 140 are provided around the heating drum 116. An endless pressure belt 118 is wound on the five winding rollers 134, 135, 136, 138 and 140. An endless outer side surface of the endless pressure belt 118 wound between the winding roller 134 and the winding roller 140 is brought into pressing contact with the peripheral surface of the heating drum 116. The photosensitive material 16 and the image receiving material 108 conveyed between the lamination roller 120 and the heating drum 116 are conveyed while being placed under pressing contact between the endless pressure belt 118 and the heating drum 116.

A flexible guide roller 142 is provided at the lower part of the heating drum 116, which is located on the downstream side of the endless pressure belt 118 as seen in the conveying direction of the photosensitive material 16. A separator 154 is supported by a shaft on the downstream side of the flexible guide roller 142 as seen in the conveying direction of the photosensitive material 16. When the photosensitive material 16, which has been wound onto the heating drum 116 and conveyed, is separated from the heating drum 116 by the separator 154, the photosensitive material 16 is wound on the flexible guide roller 142 and collectively loaded into a photosensitive-material waste receiver 178.

A separation roller 174 and a separator 176 are disposed on the downstream side of the separator 154 as seen in the conveying direction of the photosensitive material 16. An image-receiving material guide 170 and respective pairs of image-receiving material discharge rollers 172, 173 and 175 are disposed below the separation roller 174 and the separator 176. The image receiving material 108 conveyed in a state in which the photosensitive material 16 has been separated therefrom, is separated from the peripheral surface of the heating drum 116 by the separator 176 and the separation roller 174. Thereafter, the image receiving material 108 is guided and conveyed by the image-receiving material guide 170 and the pairs of image-receiving material discharge rollers 172, 173 and 175 so as to be discharged into a tray 177.

The operation of the first embodiment will now be described.

The original 42 is placed on the transparent glass plate 45 of the placement table 13 of the image recoding apparatus 10 and the pressure cover 15 is closed. Thereafter, when the magnification of an image to be recorded and the number of papers to be processed for recording are specified and instructions for starting its recording process are made, the image recording apparatus 10 starts the image recording process.

Namely, the pair of nip rollers 18 is rotated and driven so as to draw out the photosensitive material 16 from the magazine 14 in a state in which the magazine 14 accommodating the photosensitive material 16 therein has been loaded. When the photosensitive material 16, which has been pulled out from the magazine 14, is cut to a predetermined length by the cutter 20, the cut photosensitive material 16 is conveyed to the exposure portion 22. At this time, the photosensitive material 16 is reversed in such a way that the exposure surface thereof, which has been turned downward, is turned upward.

The motor 30 is activated in synchronism with the conveyance of the photosensitive material 16 to the exposure portion 22 so as to start the displacement of the placement table 13 and the exposure device 38 operates.

The photosensitive material 16, which has passed through the exposure portion 22 while being subjected to image exposure by the exposure device 38, is first fed into the switchback portion 40. Thereafter, the direction of conveyance of the photosensitive material 16 to the switchback 40 is changed by the reverse rotation of the pair of conveying rollers 26, followed by introduction into the water applicator 162 from the switchback 40. The water applicator 162 applies water, which serves as an image forming solvent, to the photosensitive material 16 and thereafter removes excess water from the surface of the photosensitive material 16. Next, the water applicator 162 conveys the so-processed photosensitive material 16 to the thermal development/ transfer portion 104.

When, on the other hand, the image receiving material 108 is withdrawn from the magazine 106 by the pair of nip rollers 110 in synchronism with the commencement of the exposure of the photosensitive material 16, the image receiving material 108 is cut to a predetermined length by the cutter 112. The cut image receiving material 108 is guided to the position immediately before the thermal development/transfer portion 104 by the pairs of conveying rollers 190, 186 and 114 while being guided by the guide plate 182, and is temporarily brought into a waiting state.

The following operation is performed in the thermal development/transfer portion 104. That is, when the conveyance of the leading end of the photosensitive material 16 delivered from the water applicator 162 between the lamination roller 120 and the heating drum 116 is detected by an unillustrated sensor or the like, the delivery of the image receiving material 108 is resumed. As a result, the image receiving material 108 is conveyed between the lamination roller 120 and the heating drum 116 and the heating drum 116 starts to operate. Thus, the photosensitive material 16 and the image receiving material 108 are nipped between the lamination roller 120 and the heating drum 116 while being superimposed on one another.

Next, the photosensitive material 16 and the image receiving material 108, which have been superimposed on each other, are nipped between the heating drum 116 and the endless pressure belt 118 and conveyed so as to be wound between the winding roller 134 and the winding roller 140 by about two-thirds of one round of the heating drum 116. At this time, the photosensitive material 16 and the image receiving material 108 are heated by the heating drum 116. As a result, movable dyes are discharged from the photosensitive material 16 according to the exposure image and transferred onto a dye fixing layer of the image receiving material 108, whereby an image corresponding to the exposed image, i.e., an image corresponding to the original 42 is formed on the image receiving material 108.

When the photosensitive material 16, which has been wound around the heating drum 116, has reached the lower part of the heating drum 116, the separator 154 is displaced by an unillustrated cam to separate the leading end of the photosensitive material 16 conveyed in advance of the image receiving material 108 from the peripheral surface of the heating drum 116. With the reset and movement of the separator 154, the leading end of the separated photosensitive material 16 is wound on the flexible guide roller 142 and conveyed downward. Thereafter, the photosensitive material 16 is conveyed to the photosensitive-material waste receiver 178 so as to be collectively loaded therein.

On the other hand, the image receiving material 108, which remains tightly stuck onto the heating drum 116, is separated from the peripheral surface of the heating drum 116 by the separation roller 174 and the separator 176. Further, the image receiving material 108 is conveyed by the pairs of image-receiving material discharge rollers 172, 173 and 175 while being guided by the image-receiving material guide 170 so as to be discharged into the tray 177.

In the exposure device 38, the light or light beams of three colors of Red, Green and Blue are applied to the surface of the original 42 in slit form from the LED array 66 used as the light-source device. The light reflected from the surface of the original 42 along the direction of the normal to the original 42 is gathered by the rod lens array 54 so as to be focused onto the photosensitive material 16 passing through the exposure point, whereby the photosensitive material 16 is exposed to light.

At this time, the current for driving the LED array 66 is set so that each of the light-emitting elements produces light at the maximum rated output. Further, the numbers of the respective light-emitting elements 62, 63 and 64 and the sequence of arrangement thereof are respectively set based on a ratio between outputs obtained when the respective light-emitting elements 62, 63 and 64 emit the light at the maximum rated outputs and a spectral sensitivity ratio of the applied photosensitive material 16.

Namely, since the ratio among the outputs of the respective light-emitting elements 62, 63 and 64 is R:G:B=60:1:30 and the color sensitivity ratio of the photosensitive material 16 is R:G:B=1:30:2, the numerical ratio among the light-emitting elements is set as R:G:B=1:2:1.

Further, one R-light-emitting element 62, two G-light-emitting elements 63 and one B-light-emitting element 64 are defined as a light-emitting element group, i.e., a unit light irradiation region. The sequence of arrangement of the light-emitting elements is determined so that a color balance is made substantially uniform within the unit irradiation region, and so that between the adjacent light-emitting element groups, the light-emitting elements of a same color are not continuous (see FIGS. 3A or 3B).

Thus, the densities of three generated colors of the photosensitive material 16 are not varied due to the difference between the outputs of the light-emitting elements 62, 63 and 64 for the respective colors and a variation in spectral sensitivity or response of the photosensitive material 16. Therefore, the densities are obtained so as to be substantially identical to each other.

Although one LED array 66 is used in the present embodiment, two LED arrays 66 may be provided with the rod lens array 54 interposed therebetween.

Figure 4:
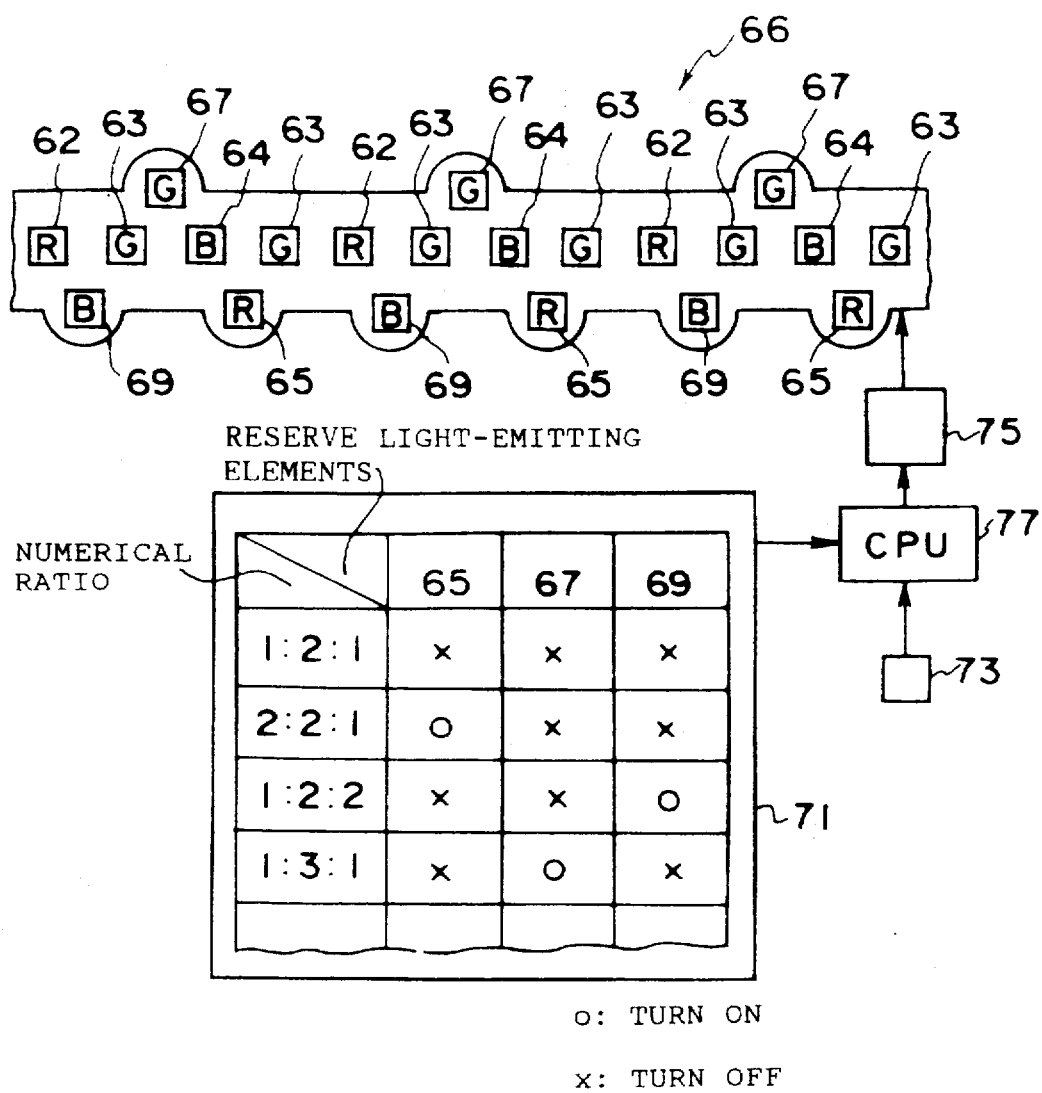
FIG. 4 is a schematic layout showing light-emitting elements including reserve light-emitting elements in addition to a principal LED array.

In the present embodiment, the numbers of the respective light-emitting elements 62, 63 and 64 and the sequence of arrangement thereof are defined with respect to the photosensitive material 16 specified. However, they of course vary depending on the color sensitivity ratio of the applied photosensitive material 16. The entire LED array 66 may be replaced by another according to this variation. However, the following may be done. Let's now assume that a plurality of types of photosensitive materials 16 exist according to the level of the frequency of use of the applied photosensitive material 16 as shown in FIG. 4. In this condition, reserve light-emitting elements 65, 67 and 69 may be provided aside from the LED array 66 (they may be fabricated integrally therewith) according to a variation in color sensitivity ratio of each photosensitive material 16 so that the reserve light-emitting elements light up as needed.

Namely, the reserve light-emitting elements 65 (67 or 69) to be light-produced, which correspond to the plurality of types of photosensitive materials 16, are constructed as a database, which are in turn stored in a storage device 71 connected to a CPU 77. A decision about the type of photosensitive material is automatically or manually made by a decision portion 73. Thereafter, each of the reserve light-emitting element 65 (or 67 or 69) may be controlled so as to light up through a driver 75.

(Second Embodiment)

A second embodiment of the present invention will be described below. Incidentally, the same elements of structure as those employed in the first embodiment are identified by like reference numerals and their description will therefore be omitted.

In the first embodiment, all the light-emitting elements of the LED array 66 are caused to produce light at the maximum rated outputs as basic requirements. Further, in order to set the numbers of the respective light-emitting elements, the number of the light-emitting element (i.e., B-light-emitting element 64 in the first embodiment) having high light quantity and indicative of the minimum value of the ratio in number among the light-emitting elements of the respective colors is set as single, and according thereto, the numbers of the other color's light-emitting elements are determined.

When the numbers of the respective light-emitting elements are set in this way, the following problems tend to occur.

Namely, the maximum rated output of the R-light-emitting element 62 whose light-emitting central wavelength is 660 nm, is 2.4 mW, the maximum rated output of the G-light-emitting element 63 whose light-emitting central wavelength is 555 nm, is 0.04 mW and the maximum rated output of the B-light-emitting element 64 whose light-emitting central wavelength is 450 nm, is 1.2 mW. If the ratio is taken among these, then the output ratio reaches R:G:B=60:1:30.

On the other hand, the color-sensitivity ratio of the frequently-used photosensitive material 16 reaches R:G:B=1:30:2 in the first embodiment. However, other photosensitive material may have a color-sensitivity ratio of R:G:B=1:30:40, for example.

An exposure-value ratio on the photosensitive material 16, which is synthetically obtained from these, becomes R:G:B=60:30:1200=20:40:1 considering the B-light-emitting element 64 as the reference as in the first embodiment. Thus, the total number of the light-emitting elements in the unit irradiation region reaches 61. This makes it impossible to arrange the respective colors in satisfactory balance and hence nonuniformity in the arrangement of the B-light-emitting elements 64 becomes pronounced.

Thus, in the second embodiment, light-emitting elements with the number thereof being of the second, i.e., R-light-emitting elements, are set as the reference (1) and the ratio between respective colors is determined. As a result of its determination, the ratio reaches R:G:B=1:2:0.05. Accordingly, the ratio in number between the respective color's light-emitting elements can be set to R:G:B=1:2:1 by setting at least two colors (corresponding to R-light-emitting element 62 and G-light-emitting element 63) to the maximum rated output and setting the B-light-emitting element 64 to one-twentieth of the maximum rated output.

If the numbers of the respective color's light-emitting elements are defined from the numerical ratio, then a unit irradiation region can be set with one R-light-emitting element 62, two G-light-emitting elements 63 and one B-light-emitting element 64 as a light-emitting element group. Thus, the present embodiment can be established in the same manner as the first embodiment.

The first and second embodiments have been described using the image recording apparatus as an illustrative example. However, the light-source device of the present invention may be used as a light source for an image reading apparatus. Namely, an image reading means such as a CCD color image sensor or the like is used as an alternative to a photosensitive material and the light-source device is employed as a light source for an optical system for focusing an image onto the image reading means. Since the image reading means also has a light-receiving sensitivity characteristic as in the photosensitive material having the spectral sensitivity characteristic, the ratio in number between the respective color's light-emitting elements may be computed to set the unit irradiation region as in the first and second embodiments.

The exposure light-source device according to the present invention, as has been described above, can bring about an excellent advantage that the light-emitting elements are caused to emit light at the maximum rated outputs so that the produced outputs can be effectively utilized, and the densities of the three colors developed by the photosensitive material can be made substantially uniform, thereby making it possible to provide uniform exposure.

Further, the image reading light-source device according to the present invention can bring about an excellent advantage that the light-emitting elements are caused to emit light at the maximum rated outputs so that the produced outputs can be effectively used, and the densities read by the image reading means can be made substantially uniform.

While the embodiments of the present invention, as herein disclosed, constitute a preferred form, it is to be understood that other forms might be adopted.

What is claimed is:

1. A light-source device for irradiating the surface of an original with light while being moved relative to the original and focusing light reflected from or transmitted through the surface of the original onto a photosensitive material so as to subject the photosensitive material to slit exposure, comprising:

light-emitting elements for emitting three colors having different light-emitting wavelengths, each element of said light-emitting elements being linearly arranged at predetermined intervals and disposed at right a angle to the direction in which said original is conveyed, the element numbers of each color of said light-emitting elements being set based on a ratio between outputs of said three-color light-emitting elements at their light-emitting wavelengths when said three-color light-emitting elements are caused to emit light at the maximum rated outputs and a ratio between sensitivities of the photosensitive material at the light-emitting wavelengths in such a manner that when at least said two-color light-emitting elements of said three-color light-emitting elements are caused to emit light at the maximum rated outputs, densities of colors on the photosensitive material, which are exposed by said light-emitting elements and are developed, are substantially identical to each other.

2. A light-source device according to claim 1, wherein the sequence of arrangement of each element of said light-emitting elements is set so that the respective colors are substantially uniform in irradiation within a predetermined unit irradiation region on the photosensitive material.

3. A light-source device according to claim 2, wherein a region to be illuminated by a group of the least number of light-emitting elements necessary to make the respective colors produced by said light-emitting elements substantially uniform in irradiation is defined as the unit irradiation region.

4. A light-source device according to claim 1, wherein said photosensitive material is a photosensitive material of the most-frequently used type.

5. A light-source device according to claim 1, wherein the numbers of said respective color light-emitting elements and the sequence of arrangement thereof are set according to a spectral sensitivity characteristic of the most-frequently used photosensitive material of a plurality of types of photosensitive materials to be used, and reserve light-emitting elements are respectively disposed according to spectral sensitivity characteristics of photosensitive materials in order in which the frequency of use of the photosensitive materials is high.

6. A light-source device according to claim 2, wherein the numbers of said respective color light-emitting elements and the sequence of arrangement thereof are set according to a spectral sensitivity characteristic of the most-frequently used photosensitive material of a plurality of types of photosensitive materials to be used, and reserve light-emitting elements are respectively provided according to spectral sensitivity characteristics of photosensitive materials in order in which the frequency of use of the photosensitive materials is high.

7. A light-source device according to claim 3, wherein the numbers of said respective color light-emitting elements and the sequence of arrangement thereof are set according to a spectral sensitivity characteristic of the most-frequently used photosensitive material of a plurality of types of photosensitive materials to be used, and reserve light-emitting elements are provided according to spectral sensitivity characteristics of photosensitive materials in order in which the frequency of use of the photosensitive materials is high.

8. A light-source device according to claim 1, wherein when the element nunmbers of each color of said light-emitting elements are set based on a ratio between outputs of said light-emitting elements at their light-emitting wavelengths when said light-emitting elements are caused to emit light at the maximum rated outputs and a ratio between sensitivities of the photosensitive material at the light-emitting wavelengths in such a manner that densities of colors on the photosensitive material, which are exposed by said light-emitting elements and are developed, are substantially identical to each other, all the light-emitting elements are caused to emit light at the maximum rated outputs to thereby set the element numbers of said respective three-color of said light-emitting elements when the element numbers of said respective three-color of said light-emitting elements are close to each other.

9. A light-source device according to claim 1, wherein when said three-color light-emitting elements are respectively set in number based on a ratio between outputs of said three-color light-emitting elements at their light-emitting wavelengths when said three-color light-emitting elements are caused to emit light at the maximum rated outputs and a ratio between sensitivities of the photosensitive material at the light-emitting wavelengths in such a manner that densities of colors on the photosensitive material, which are developed by said three-color light-emitting elements, are substantially identical to each other, the light-emitting element for one color is caused to emit light at an output for providing values close to the numbers of said respective light-emitting elements for other two colors when the number of said light-emitting elements for one color is much different from the numbers of said remaining respective light-emitting elements, and said light-emitting elements for other two colors are caused to emit light at the maximum rated outputs, whereby the numbers of said respective light-emitting elements for the three colors are set.

10. A light-source device for irradiating the surface of an original with light while being moved relative to the original and focusing light reflected from or transmitted through the surface of the original onto a photosensitive material so as to subject the photosensitive material to slit exposure, comprising:

light-emitting elements for producing three colors having light-emitting wavelengths different from each other, said three-color light-emitting elements being linearly arranged at predetermined intervals and disposed at a right angle to the direction in which said original is conveyed, said three-color light-emitting elements being respectively set in number based on a ratio between outputs of said three-color light-emitting elements at their light-emitting wavelengths when said three-color light-emitting elements are caused to emit light at the maximum rated outputs and a ratio between sensitivities of the photosensitive material at the light-emitting wavelengths in such a manner that when said three-color light-emitting elements are caused to emit light at the maximum rated outputs, densities of colors on the photosensitive material, which are color-developed by said three-color light-emitting elements, are substantially identical to each other.

11. A light-source device according to claim 10, wherein the sequence of arrangement of said three-color light-emitting elements is set so that the respective colors are substantially uniform in irradiation within a predetermined unit irradiation region on the photosensitive material.

12. A light-source device according to claim 11, wherein a region to be illuminated by a group of the least number of light-emitting elements necessary to make the respective colors produced by said light-emitting elements substantially uniform in irradiation is defined as the unit irradiation region.

13. A light-source device according to claim 10, wherein the numbers of said respective color light-emitting elements and the sequence of arrangement thereof are set according to a spectral sensitivity characteristic of the most-frequently used photosensitive material of a plurality of types of photosensitive materials to be used, and reserve light-emitting elements are respectively disposed according to spectral sensitivity characteristics of photosensitive materials in order in which the frequency of use of the photosensitive materials is high.

14. A light-source device according to claim 11, wherein the numbers of said respective color light-emitting elements and the sequence of arrangement of said light-emitting elements are set according to a spectral sensitivity characteristic of the most-frequently used photosensitive material of a plurality of types of photosensitive materials to be used, and reserve light-emitting elements are respectively provided according to spectral sensitivity characteristics of photosensitive materials in order in which the frequency of use of the photosensitive materials is high.

15. A light-source device according to claim 12, wherein the numbers of said respective light-emitting elements for the colors and the sequence of arrangement of said light-emitting elements are set according to a spectral sensitivity characteristic of the most-frequently used photosensitive material of a plurality of types of photosensitive materials to be used, and reserve light-emitting elements are provided according to spectral sensitivity characteristics of photosensitive materials in order in which the frequency of use of the photosensitive materials is high.

16. A light-source device for irradiating the surface of an original with light while being moved relative to the original and focusing light reflected from or transmitted through the surface of the original onto an image reading means so as to read an image of said original, comprising:

light-emitting elements for producing three colors having light-emitting wavelengths different from each other, said three-color light-emitting elements being linearly arranged at predetermined intervals and disposed at a right angle to the direction in which said original is conveyed, said three-color light-emitting elements being respectively set in number based on a ratio between outputs of said three-color light-emitting elements at their light-emitting wavelengths when said three-color light-emitting elements are caused to emit light at the maximum rated outputs and a ratio between sensitivities of the image reading means at the light-emitting wavelengths in such a manner that when at least said two-color light-emitting elements of said three-color light-emitting elements are caused to emit light at the maximum rated outputs, densities of colors produced by said three-color light-emitting elements, which have been read by the image reading means, are substantially identical to each other.

17. A light-source device according to claim 16, wherein the sequence of arrangement of said three-color light-emitting elements are set so that the respective colors are substantially uniform in irradiation within a predetermined unit irradiation region on the image reading means.

18. A light-source device according to claim 17, wherein a region to be illuminated by a group of the least number of light-emitting elements necessary to make the respective colors produced by said light-emitting elements substantially uniform in irradiation is defined as the unit irradiation region.

19. A light-source device according to claim 16, wherein when said three-color light-emitting elements are respectively set in number based on a ratio between outputs of said three-color light-emitting elements at their light-emitting wavelengths when said three-color light-emitting elements are caused to emit light at the maximum rated outputs and a ratio between sensitivities of the image reading means at the light-emitting wavelengths in such a manner that densities of colors produced by said three-color light-emitting elements, which have been read by the image reading means, are substantially identical to each other, all the three-color light-emitting elements are caused to emit light at the maximum rated outputs to thereby set the numbers of said respective three-color light-emitting elements when the numbers of said respective three-color light-emitting elements are close to each other.

20. A light-source device according to claim 16, wherein when said three-color light-emitting elements are respectively set in number based on a ratio between outputs of said three-color light-emitting elements at their light-emitting wavelengths when said three-color light-emitting elements are caused to emit light at the maximum rated outputs and a ratio between sensitivities of the image reading means at the light-emitting wavelengths in such a manner that densities of colors produced by said three-color light-emitting elements, which have been read by the image reading means, are substantially identical to each other, said light-emitting element for one color is caused to emit light at an output for providing values close to the numbers of said respective light-emitting elements for other two colors when the number of said light-emitting elements for one color is much different from the numbers of said remaining respective light-emitting elements, and said light-emitting elements for other two colors are caused to emit light at the maximum rated outputs, whereby the numbers of said respective light-emitting elements for the three colors are set.

* * * * *